US011168989B2

(12) United States Patent
Fowe

(10) Patent No.: US 11,168,989 B2
(45) Date of Patent: Nov. 9, 2021

(54) SUPERVISED POINT MAP MATCHER

(71) Applicant: HERE Global B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 381 days.

(21) Appl. No.: 16/237,945

(22) Filed: Jan. 2, 2019

(65) Prior Publication Data
US 2020/0208992 A1     Jul. 2, 2020

(51) Int. Cl.
| | |
|---|---|
| *G01C 21/30* | (2006.01) |
| *G01C 21/00* | (2006.01) |
| *G06F 17/18* | (2006.01) |
| *G01C 21/36* | (2006.01) |
| *G01C 21/34* | (2006.01) |
| *G05D 1/02* | (2020.01) |

(52) U.S. Cl.
CPC .......... *G01C 21/30* (2013.01); *G01C 21/3811* (2020.08); *G01C 21/3819* (2020.08); *G06F 17/18* (2013.01); *G01C 21/3415* (2013.01); *G01C 21/3667* (2013.01); *G05D 1/0274* (2013.01)

(58) Field of Classification Search
CPC ............... G01C 21/30; G01C 21/3811; G01C 21/3819; G01C 21/3667; G01C 21/3415; G06F 17/18; G05D 1/0274
See application file for complete search history.

(56) References Cited

U.S. PATENT DOCUMENTS

| | | | | |
|---|---|---|---|---|
| 5,359,529 | A * | 10/1994 | Snider .................... | G01C 21/30 701/417 |
| 9,500,486 | B2 * | 11/2016 | Gale et al. ............. | G01C 21/30 |
| 10,060,751 | B1 * | 8/2018 | Chen ....................... | G06F 16/29 |
| 10,151,592 | B2 * | 12/2018 | Averbuch et al. ..... | G01C 21/30 |
| 2002/0065603 | A1 * | 5/2002 | Watanabe et al. ..... | G01C 21/30 701/446 |

(Continued)

FOREIGN PATENT DOCUMENTS

CN           104515528           4/2015

OTHER PUBLICATIONS

Tang et al., "An adaptive map-matching algorithm based on hierarchical fuzzy system from vehicular GPS data"; Central South University, China; Tongji University, China; Dec. 5, 2017; 11 pages.

*Primary Examiner* — Dale W Hilgendorf
(74) *Attorney, Agent, or Firm* — Lempia Summerfield Katz LLC

(57) ABSTRACT

System and methods are provided for a supervised point map matcher. The supervised point map matcher learns parameters from historical data that provide insight into the optimal probabilistic metrics that inform the bias of probes heading and distance for segments on the roadway. Probability weights for segments are generated. A more accurate path based map matching algorithm is used to identify direction and heading errors in the historical probe data. Values for the probability weights are calculated using kernel density estimation and a gaussian probability density function. The probability weights are used to improve the real time performance of the point map matcher. A confidence value is calculated as a function of the probability weights and provided with the map matched results.

20 Claims, 10 Drawing Sheets

(56) References Cited

U.S. PATENT DOCUMENTS

| | | | | |
|---|---|---|---|---|
| 2005/0228584 A1* | 10/2005 | Adachi | ............... | G09B 29/106 |
| | | | | 701/448 |
| 2009/0174600 A1* | 7/2009 | Mazlum | ................. | G01S 19/50 |
| | | | | 342/357.58 |
| 2011/0208424 A1* | 8/2011 | Hirsch et al. | ........ | G01C 21/165 |
| | | | | 701/532 |
| 2012/0116678 A1* | 5/2012 | Witmer | ................. | G01C 21/32 |
| | | | | 702/5 |
| 2013/0076538 A1* | 3/2013 | Uno et al. | ........ | G08G 1/096716 |
| | | | | 340/905 |
| 2013/0311086 A1* | 11/2013 | Aoki et al. | ............ | G01C 21/30 |
| | | | | 701/446 |
| 2014/0067256 A1* | 3/2014 | Aoki et al. | ............ | G01C 21/30 |
| | | | | 701/417 |
| 2016/0069690 A1* | 3/2016 | Li | .......................... | G01S 19/49 |
| | | | | 701/412 |
| 2016/0239983 A1* | 8/2016 | Dorum et al. | ......... | G01C 21/32 |
| 2017/0219359 A1 | 8/2017 | Elhoushi et al. | | |
| 2017/0219360 A1* | 8/2017 | Cui | ....................... | G01C 21/34 |
| 2018/0058860 A1* | 3/2018 | Matsumoto | .......... | G08G 1/0129 |
| 2019/0186927 A1* | 6/2019 | Koponen | ............... | G01C 21/30 |

* cited by examiner

SUPERVISED POINT MAP MATCHER

FIELD

The following disclosure relates to navigation devices or services.

BACKGROUND

Navigation services use positional data to locate vehicles or devices. A simple location on its own may not be useful to a user. Map matching is the process used to match the location to a digital map where the map matched location may be used in mapping or routing applications. The input to most matching algorithms includes location data acquired using a systems such as a global positioning system referred to commonly as GPS.

For location data such as from GPS, there exists the possibility for errors or inaccurate measurements. An accurate location determination from a GPS receiver requires line of sight with GPS satellites. Satellite geometry also becomes an issue when using a GPS receiver in a vehicle, near tall buildings, or in mountainous or canyon areas. When the GPS signals are blocked from several satellites, the relative position of the remaining satellites determines how accurate the GPS position will be. The fewer the satellites, the less accurate the GPS position will be.

Another source of error in GPS is multipath. Multipath is the result of a radio signal being reflected off an object. With GPS, multipath occurs when the signal bounces off a building or terrain before reaching the GPS receiver's antenna. The signal takes longer to reach the receiver than if the signal travelled a direct path. The added time makes the GPS receiver calculate that the satellite is farther away than the satellite really is. The added time increases the potential for error in the overall position determination. For example, errors may be introduced when signals are reflected of buildings or geographical entities such as large rocks, etc. As the less direct path will be longer and take extra time, this can add errors into the system if the receiver recognizes the reflected signal.

Propagation delay due to atmospheric effects and internal clock errors may also affect accuracy. Clock errors may be introduced as a clock inside the receiver may be nowhere near as accurate as the atomic clocks on board the satellite. GPS satellite orbit errors may also result from deviations from the positions given in ephemeris data.

Prior to the de-activation of the selective availability, accuracies to within around 100 meters could be obtained. Afterwards, accuracies to within 15 meters or less may be obtained. The accuracies, however, depend on many factors including errors discussed above, the number and position of the satellites as well as the design of the receiver, for example, parallel multi-channel receivers are able to provide significant improvements over earlier systems.

The result is that while GPS is useful, it is not accurate enough to pin point the exact location of a receiver. Errors or inaccurate measurements for positional data may lead to incorrect map matches. Incorrect map matches may result in severe consequences for both the mapping service and an end user.

SUMMARY

In an embodiment, a method is provided for providing a point based map matching algorithm. A plurality of probe reports for a road segment are acquired. The plurality of probe reports comprise heading data and a plurality of positional points generated using global positioning systems. The plurality of positional points are map matched using a path based map matching algorithm. The plurality of positional points are map matched using a point based map matching algorithm. Accurately point based map matched positional points and erroneously point based map matched positional points are determined using a comparison between the path based map matched positional points and the point based map matched positional points. A distance error value and a heading error value for each of the accurately point based map matched positional points and the erroneously point based map matched positional points is identified. A probability density distribution is generated using kernel density estimation for each of the distance error values and heading error values for the accurately point based map matched positional points and the erroneously point based map matched positional points. Probability weights are calculated for each of the probability density distributions. The probability weights are provided for use in real time map matching with the point based map matching algorithm.

In an embodiment, a method is provided for identifying a current road segment of a device. A processor acquires positional data and heading data of the device. The processor identifies a plurality of road segments based on the positional data. The processor determines a closest point between the positional data and each of the plurality of road segments The processor calculates a distance to the closest point for each of the plurality of road segments. The processor identifies a road segment heading for each of the plurality of road segments. The processor computes a match probability for each of the plurality of road segments as a function of the distances, road segment headings, heading data, distance weight, and heading weight; wherein the distance weight and heading weight are calculated for each road segment as a function of a kernel density estimation for a plurality of historical probe data reports. The processor selects a road segment with the highest match probability as the current road segment for the device.

In an embodiment, a navigation device is provided. The navigation device includes a global positioning system, a magnetometer, a geographic database, and a map matching processor. The global positioning system is configured to provide positional data. The magnetometer is configured to provide heading data. The geographic database is configured to store road segment heading data, distance weights, and heading weights for a plurality of road segments. The distance weights and heading weights are calculated for each road segment of the plurality of road segments as a function of a kernel density estimation for a plurality of historical probe data reports. The map matching processor is configured to identify a current road segment using a point map matcher, the positional data, the road segment heading data, the distance weights, and the heading weights.

BRIEF DESCRIPTION OF THE DRAWINGS

Exemplary embodiments of the present invention are described herein with reference to the following drawings.

DETAILED DESCRIPTION

Figure 1:
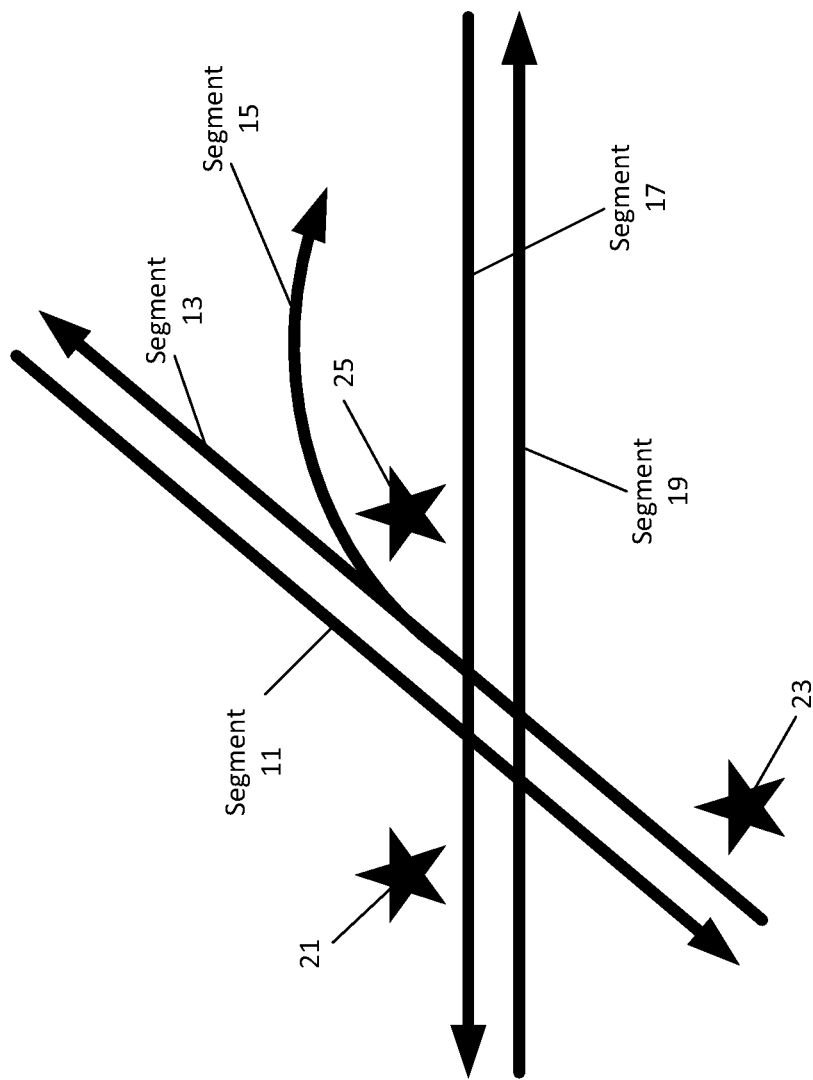
FIG. 1 depicts an example roadway configuration

Embodiments described herein provide systems and methods for a supervised point map matcher. The supervised point map matcher learns parameters of kernel density clusters that provide insight into the optimal probabilistic metrics that inform the intrinsic discriminant bias of probes heading and distance for segments on the roadway. Probability weights for segments are generated using historical probe data. A more accurate path based map matching algorithm is used to identify direction and heading errors in the historical probe data. Values for the probability weights are calculated using kernel density estimation and a gaussian probability density function. The probability weights are used to improve the real time performance of the point map matcher.

Accurately locating a vehicle on a map is of crucial importance to various applications in the field of navigation services. Vehicle location systems allow fleet operators to save millions of dollars through reduction of fuel wastage and better utilization of resources. Dynamic route guidance minimizes traffic congestion and improves the overall utilization of the road network by assisting drivers to avoid congested routes and guiding them in an unfamiliar locality. Autonomous vehicles rely heavily on high definition (HD) maps and navigation services. These applications are made possible due to the ability to accurately locate the user, device, or vehicle on the roadway network.

Different systems may be used to provide locational services on the roadway. Dead reckoning, for example, has been used for hundreds of years and involves calculating one's current position by using a previously determined position, or fix, and advancing that position based upon known or estimated speeds over elapsed time and course. Locations may also be determined using beacons or known points of interest. Another one of the most widely used systems is the global positioning system referred to commonly as GPS. GPS provides a positional output based on a satellite based radio navigation system. GPS is based on time and the known position of GPS specialized satellites. The satellites carry very stable atomic clocks that are synchronized with one another and with the ground clocks. Any drift from true time maintained on the ground is corrected daily. The satellite locations are known with great precision which allows a latitude and longitude of a receiver to be calculated by comparing signals and timing from the satellites.

The positional output of a GPS, e.g. the latitude and longitude, may be converted into X and Y coordinates with respect to a two-dimensional surface. However, for most applications that require vehicle location, such a positional output is meaningless unless the latitude and longitude can be correlated to a road or feature. In addition, by matching the GPS data to a road, the inherent errors discussed above with respect to GPS are corrected. Map matching is the process used to match the inaccurate raw position provided by the positioning system to a position, e.g. link or segment, on the road network. A simple way of performing map matching is to match the raw position estimated by the positioning system to the nearest road segment. While this method is easy and quick to implement it may be inaccurate when dealing with complicated roadway configurations.

FIG. 1 depicts an example map matching problem. FIG. 1 depicts five segments 11, 13, 15, 17, and 19 and three probe points 21, 23, and 25. A point based map matcher may have difficultly correctly matching the positional points. The probe points may be miss map matched to on the parallel roads or to the offramp segment 15. Even using heading, the probe point 25 may be difficult for a point based map matcher. Using additional information such as prior data points or other more complex algorithms may provide an accurate answer but may be too slow or too computationally intensive. This is one of the problems with map matching. There is a tradeoff between accuracy and speed. Point based map matchers are known to be very fast but include lower accuracy while path based map matchers are slower but include higher accuracy.

Embodiments provide a supervised point map matcher that improves its accuracy using a path based map matcher. The more accurate path based map matching algorithm is run using historical probe data. The accurate map matched points are used to identify the error patterns of segments that are located in challenging road geometry that makes it hard for a point based map matcher to obtain accurate map matching. The successful and failed map matchers are encoded as probability distributions in an artifact such that they can guide point map matching in real-time.

Figure 2:
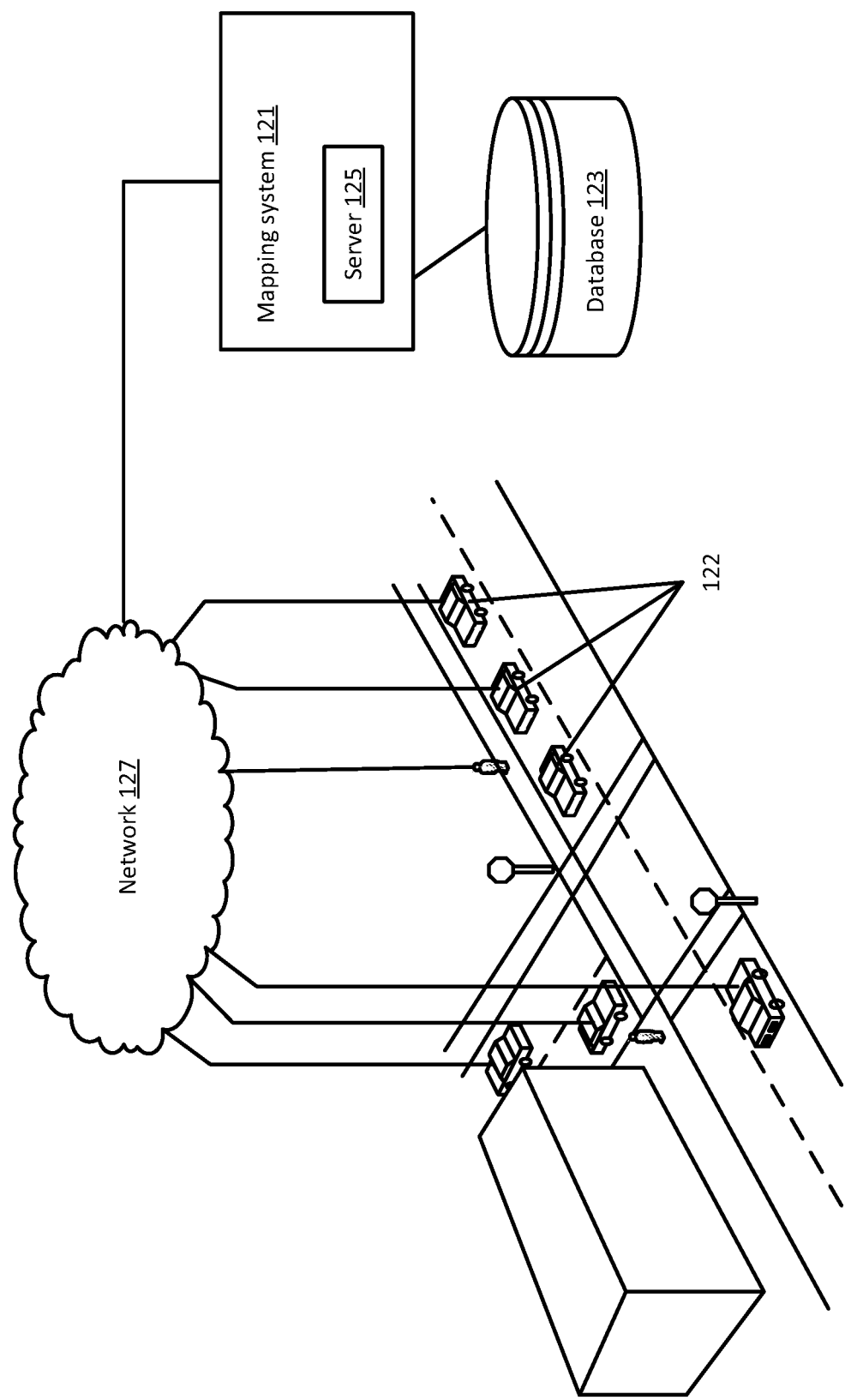
FIG. 2 depicts an example system for map matching with a supervised point map matcher.

FIG. 2 depicts a system for improved point map matching. The system includes one or more devices 122, a network 127, and a mapping system 121. The mapping system 121 may include or may be connected to a database 123 (also referred to as a geographic database or map database). The mapping system 121 may include one or more servers 125. Additional, different, or fewer components may be included.

The mapping system 121 and devices 122 are connected to the network 127. The devices 122 may receive or transmit data through the network 127. The mapping system 121 may receive or transmit data through the network 127. The mapping system 121 may also transmit paths, routes, or feature data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, DSRC (otherwise known as WAVE, ITS-G5, or 802.11p and future generations thereof), a 5G wireless network, or wireless short-range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The mapping system 121 may include multiple servers 125, workstations, databases, and other machines connected together and maintained by a map developer. The mapping system 121 may be configured to receive probe reports from the device 122.

The mapping system 121 may be configured to provide a more accurate point map matcher. The mapping system 121 may be configured to perform accurate map matching using several probes data (e.g. 3 to 6 months of historical data) and identify the error patterns of segments that are located in challenging road geometry. The mapping system 121 is configured to encode the successful and failed map matchers as probability distributions in an artifact such that the probability distributions can guide point map matching in real time. The mapping system 121 may also be configured to generate routes or paths between two points (nodes) on a stored map. The mapping system 121 may be configured to provide up to date information and maps to external geographic databases 123 or mapping applications. The mapping system 121 may be configured to encode or decode map or geographic data.

The mapping system 121 may include one or more server(s) 125. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the road segments, segments, paths, or routes using historical, recent, or real time collected data.

The mapping system 121 includes the geographic database 123. In order to provide navigation related features and functions to the end user, the mapping system 121 accesses the geographic database 123.

Figure 3:
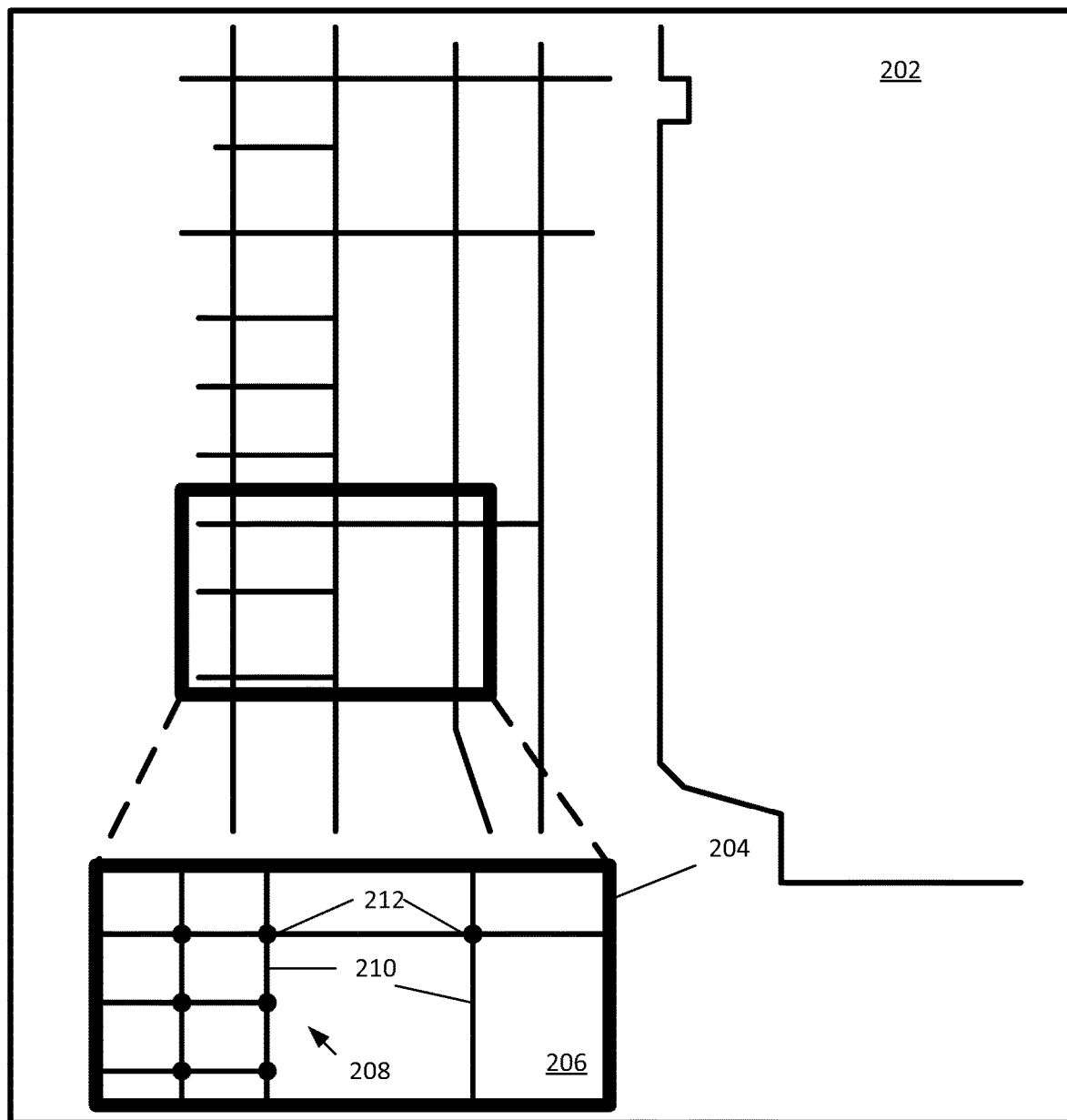
FIG. 3 illustrates a map of a geographic region.

The geographic database 123 includes information about one or more geographic regions. FIG. 3 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 4:
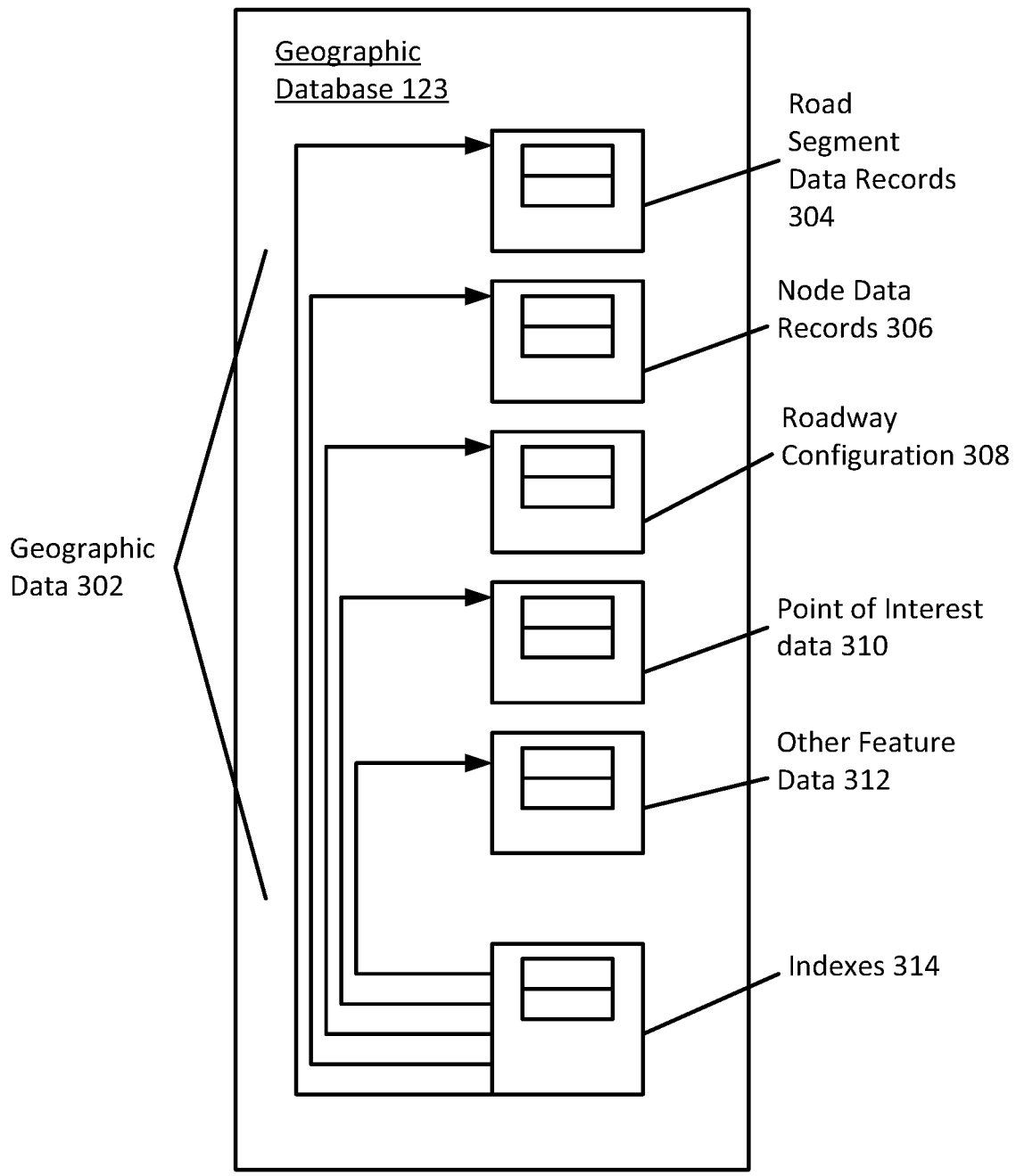
FIG. 4 depicts an example of a geographic database.

As depicted in FIG. 4, in one embodiment, the geographic database 123 contains geographic data 302 that represents some of the geographic features in the geographic region 202 depicted in FIG. 2. The data 302 contained in the geographic database 123 may include data that represent the road network 208. In FIG. 3, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include roadway data 308-312. The roadway data 312 may represent types of geographic features or other artifacts that describe the roadway network. The data may include artifacts such as headings for segments, distance weights, and heading weights. The headings for segments may be defined as a function or value. The distance weight and heading weight may be calculated using a supervised machine learning process describe below. The feature data may include, for example, point of interest data 310 or roadway configuration data 308.

The other kinds of feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data may also include painted signs on the road, traffic signal, physical and painted features like dividers, lane divider markings, road edges, center of intersection, stop bars, overpasses, overhead bridges etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

The data in the geographic database 123 may be divided into partitions or tiles. Each partition or tile may contain one or more road segments. The configuration of road segments in each partition or tile may be assigned a type. Partitions or tiles that include similar configurations may be assigned the same type. For example, all partitions or tiles that include a T junction may be assigned a T junction type. The size of the partitions or tiles may be defined by the geographic database 123. The types of the partitions or tiles may be used to extend collected ground truth data to the entirety of the geographic database. In an example, data from one type of configuration of road segments may be extrapolated to a different set of segments in a different partition or tile if the configurations are similar. Patterns may be identified across the geographic database 123 between tiles or partitions. The patterns may be used to assign the types.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Actual observed feature data may be referred to as ground truth data. Remote sensing, such as aerial or satellite photography, may be used. The database 123 is connected to the server 125.

The geographic database 123 and the data stored within the geographic database 123 may be licensed or delivered on-demand. Other navigational services or traffic server providers may access the traffic data and the feature data stored in the geographic database 123. Data including feature data may be broadcast as a service. The device 122 may store a copy of the geographic database 123.

The system includes one or more devices 122. The one or more devices 122 may include probe devices, probe sensors, or other devices 122 such as personal navigation devices 122 or connected vehicles. The mapping system 121 may communicate with the devices 122 through the network 127. The mapping system 121 may also receive data from one or more systems or services that may be used to identify the location of a vehicle or roadway conditions. The device 122 may be a navigation system built into the vehicle and configured to monitor the vehicle. The devices 122 may also be integrated in or with a vehicle. The devices 122 may include mobile phones running specialized applications that collect location data as the devices 122 are carried by persons or things traveling the roadway system. The devices 122 may be configured to collect and transmit data including the location of a vehicle. The devices 122 may be configured to provide guidance for a user or vehicle.

The device 122 may be integrated into an autonomous vehicle or a highly-assisted or highly-automated driving (HAD) vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or comply with a routing or driving instruction from the device 122 or mapping system 121.

The device 122 may be configured as a navigation system for an autonomous vehicle or a HAD. Any of these assisted driving systems may be incorporated into the device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125. An autonomous vehicle or HAD may take route instructions based on a road segment and node information provided to the navigation device 122. An autonomous vehicle or HAD may be configured to receive routing instructions from a mapping system 121 and automatically perform an action in furtherance of the instructions.

A HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the position of the vehicle and routing instructions.

ADAS vehicles include one or more partially automated systems in which the vehicle alerts the driver. The features may be used to provide alerts to the operator regarding upcoming features. ADAS vehicles may include adaptive cruise control, automated braking, or steering adjustments to keep the driver on the correct road segment. ADAS vehicles may issue warnings for the driver based on the position of the vehicle either on a roadway or within a road network system.

The device 122 includes a positioning system that acquires locational data for the device 122. The positioning system may include a GPS receiver. GPS receivers work by communicating with multiple satellites. A signal of time is sent from a GPS satellite at a given point. Subsequently, the time difference between GPS time and the point of time clock which GPS receiver receives the time signal will be calculated to generate the distance from the GPS receiver to the satellite. The same process will be done with three other available satellites. It is possible to calculate the position of the GPS receiver from distance from the GPS receiver to three satellites. The accuracy of the GPS coordinates depends on many factors, with the result that the computed latitude and longitude can be from 0.5 meters to up to 40 meters away from the actual position. It is often impossible to determine a GPS position inside tunnels, inside buildings or in urban canyons. GPS receivers cannot provide a maximum deviation and thus, for example, are unable to indicate that the calculated location lies within 3.5 meters of the actual location with 95% probability.

The device 122 may be configured to map match the locational data from, for example, a GPS receiver with a road segment on a roadway network stored in a geographic database. Different algorithms and software may be used to associate or match the location with a known position on a map, e.g. a correct road segment. The complexity of the algorithms is both related to the accuracy of the algorithm and the processing time and resources required. More complex algorithms such as path based map matching algorithms may be more accurate, but require additional time, additional inputs, and additional computing resources. Simple algorithms such as point based map matchers may be very quick and efficient.

Figure 5:
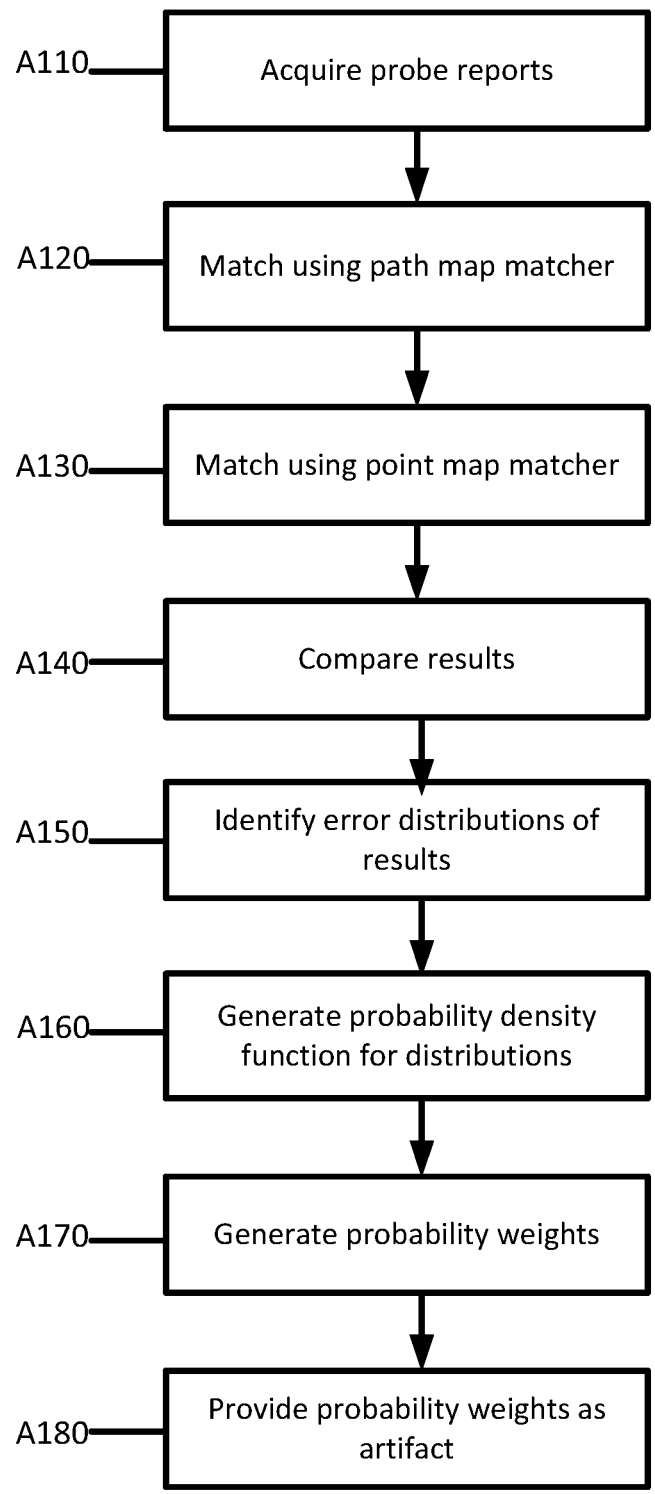
FIG. 5 depicts an example flowchart for calculating probability weights for a point map matcher.

FIG. 5 illustrates an example flow chart for generating a more accurate point map matcher. As presented in the following sections, the acts may be performed using any combination of the components indicated in FIG. 2, FIG. 8, or FIG. 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

FIG. 5 illustrates a method that uses supervised machine learning technique for a point based map matcher. The spatial distribution of errors is tracked as compared to a ground truth (path based map matcher may be used as ground truth). The distributions in terms of distance and heading give a good understanding of the possible point based map matching errors that could be forced by the surrounding geometry of a road segment. Encoding this knowledge as part of a mapping artifact provides intelligence to the point map matcher when map matching in real-time.

At act A110, the mapping system 121 acquires a plurality of probe reports for a segment comprising a plurality of positional points generated using global positioning systems and a heading. The plurality of probe reports may be acquired over a period of time. For example, over a month, three months, or six months or longer. The period of time may be smaller or larger depending on the number of probe reports acquired. The plurality of probe reports may be referred to as historical data.

In an embodiment, the mapping system 121 acquires a plurality of probe reports for an area. The area may represent a partition or tile in the geographic database. The area may include at least two or more road segments. The size of the area may depend on the region, the configuration of the roadway network, and the number of segments. Segments may range in size from small to large. A rural segment may be larger than a segment in an urban environment.

Figure 6A:
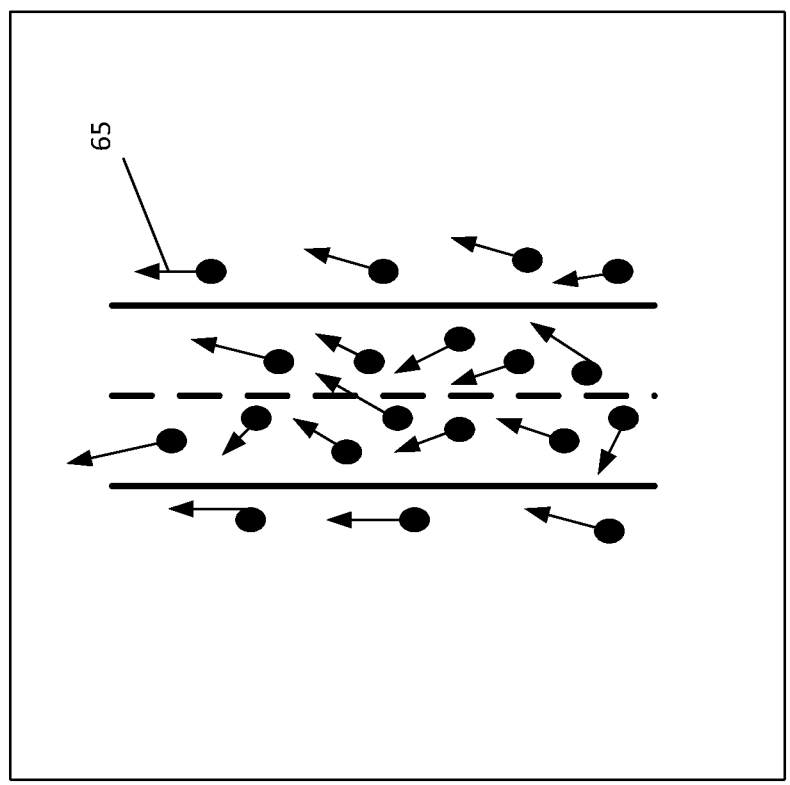
FIGS. 6A and 6B depicts a plurality of positional points and headings from a plurality of historical probe data for a segment.
Figure 6B:
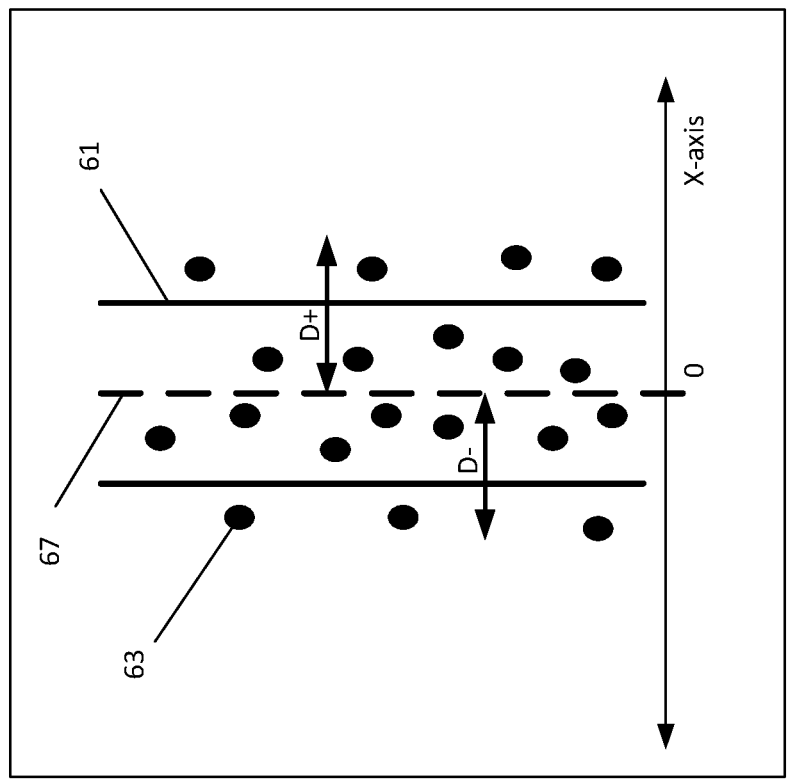

FIGS. 6A and 6B depicts a plurality of positional points and headings from a plurality of historical probe data for a segment. In FIG. 6A, the depicted area includes a single segment 61 and a plurality of probe points 63. The segment includes a centerline 67 from which the distance error values are calculated. Each probe point 63 may be map matched to the segment 61 so that the distance of the probe point 63 to the centerline 67 is the distance error. Similarly, in 6B the same segment 61 is depicted. Instead of distance values, the figure depicts the heading errors. Each probe point 63 includes a heading 65 (depicted by the arrows) that is compared against the heading of the road segment to determine the heading error.

At act A120, the mapping system 121 map matches the positional and heading data using a path map matcher. A path based map matcher may use the proximity of the positioning point to a segment, the heading, the similarity between the heading of successive points and a segment and, and a relationship between segments and positioning points. For example, a path based map matcher may give more weight to a segment when calculating a segment map if the link connects to a previous link the in the path of the device. The map matched positional points and the links may be presumed to be accurate or equivalent to ground truth data. Ground truth refers to information provided by direct observation as opposed to information provided by inference. Accordingly, the path based map matcher may be selected to be highly accurate. The workflow of FIG. 5 may be performed offline and as such may not be time sensitive. The path based map matcher may be slow but accurate.

Alternatively map matching algorithms may also be used to calculate the ground truth data. For example, a Hidden Markov Model (HMM) may be used to map match the plurality of positional points. Actual ground truth data may also be used. A probe vehicle may traverse a roadway acquiring positional data using a GPS receiver. A participant in the probe vehicle may observe and record the actual location of the vehicle. The actual location, e.g. road segment or link, serves as the map matched data. The path based map matched positional points are stored with the map matched link.

In an embodiment, act A120 may be skipped if the positional coordinates are already matched for a segment. For example, at act A120, the plurality of probe reports may already have been matched and sorted by segments. As such, the plurality of probe reports may only include positional data and heading data that has been accurately matched to the segment using an accurate map matcher or subsequently corrected (for example by comparing a known traversal of a route against the collected positional and heading data during the traversal).

At act A130, the mapping system 121 map matches the positional and heading data using a point map matcher. A point map matcher may only use the positional points and heading from a probe report and not data from other reports. Due to the static and limited inputs and simplistic determination, the point map matcher may be very quick and resource efficient. However, the quickness and efficiency comes with a downside of not being as accurate as, for example, a path based map matcher. Path based map matchers may be more accurate as a path based map matcher may use prior data points or other mechanisms to predict the current location while the point based map matchers only use a single data point and heading. The point based map matched positional points are stored with the map matched link.

At act A140, the mapping system 121 determines accurately point based map matched positional points and erroneously point based map matched positional points using a comparison between the path based map matched positional points and the point based map matched positional points. Accurate point based map matched positional points include positional points that are matched to the same link for both the path map matcher at act A120 and the point map matcher at act A130. Erroneously point based map matched positional points include positional points that matched to different links by the path map matcher at act A120 and the point map matcher at act A130.

At act A150, the mapping system 121 identifies a distance error value and a heading error value for each of the accurately point based map matched positional points and the erroneously point based map matched positional points. As depicted in FIG. 6B described above, each of the positional points may be located a distance from a centerline or reference line for the link. The distance error value may represent the distance for each of the positional points from the reference line. The distance may be the shortest distance from the positional point to the reference line, if for example, the reference line is a curve or arc. A positive distance may be used for positional points on one side of the reference line while a negative distance may be used for positional points on the other side. Which side is positive/negative is immaterial as long as the system is consistent. The heading error value may represent an angular difference between the heading of the probe report and the heading of the link. Each link may include a heading. The heading may represent the direction that the centerline or reference line faces at any given point on the centerline or reference line. The heading of the road segment may be stored for each point on the road segment or may be defined by a function (for example, that describes a curve or arc of the road segment). The heading error value, as such, may be a value between 0 and 180, values that represent the possible differences between the heading in the probe report and the heading of the road segment.

At act A160, the mapping system 121 generates a probability density function for the road link for the distance error values and for the heading error values for the accurately point based map matched positional points and the erroneously point based map matched positional points. A probability density function (PDF), or density of a continuous random variable, is a function, whose value at any given point in the set of possible values taken by the random variable can be interpreted as providing a relative likelihood that the value of the random variable would equal that sample. One method of generating the PDF is to use kernel density estimation or KDE. KDE is a non-parametric way to estimate the probability density function of a random variable. KDE uses data smoothing to make inferences about an entire population based on a finite data sample. The entire population here is the expected error when map matching a positional point to the segment. The finite data sample if the historical data. The historical data is thus used to predict the error for a future positional point that is being map matched.

The KDE algorithm uses a parameter, referred to as bandwidth, that affects how smooth the resulting curve is. The KDE is calculated by weighting the distances of all the data points. If there are more points nearby, the estimate is higher, indicating that probability of seeing a point at that location. Changing the bandwidth changes the shape of the kernel: for a lower bandwidth, only points very close to the current position are given any weight, which leads to the estimate looking chaotic. A higher bandwidth leads to a shallow kernel where distant points contribute to the curve.

Figure 7:
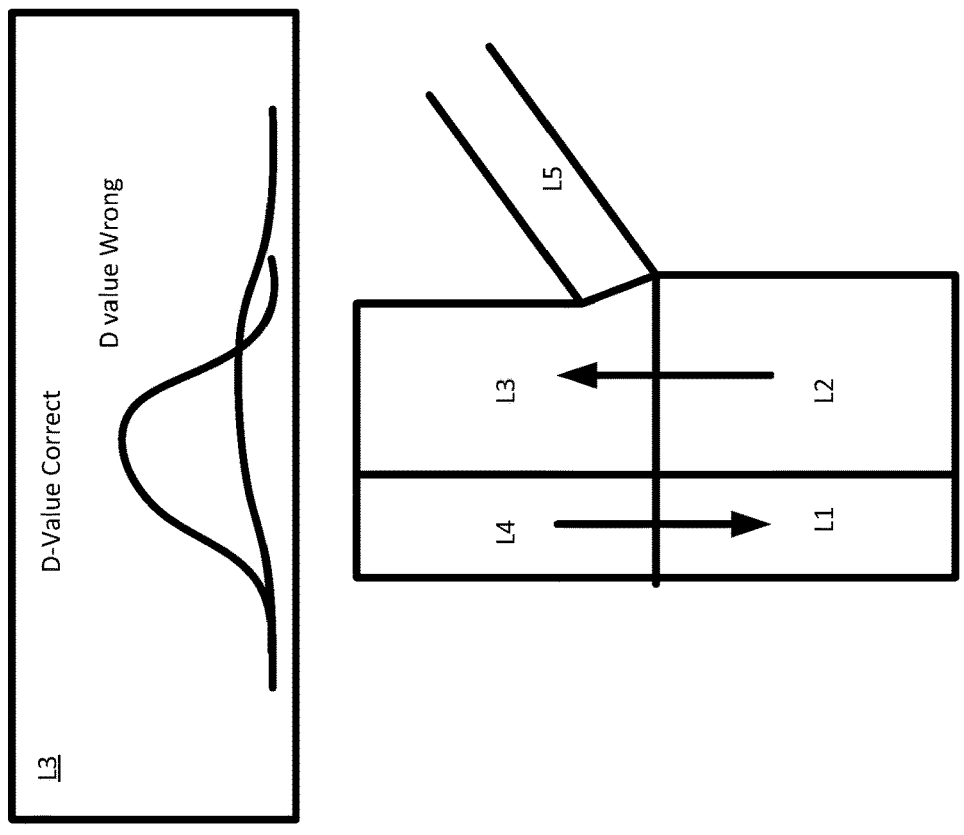
FIG. 7 depicts an example of probability density functions for several segments on a roadway partition.
Figure 7:
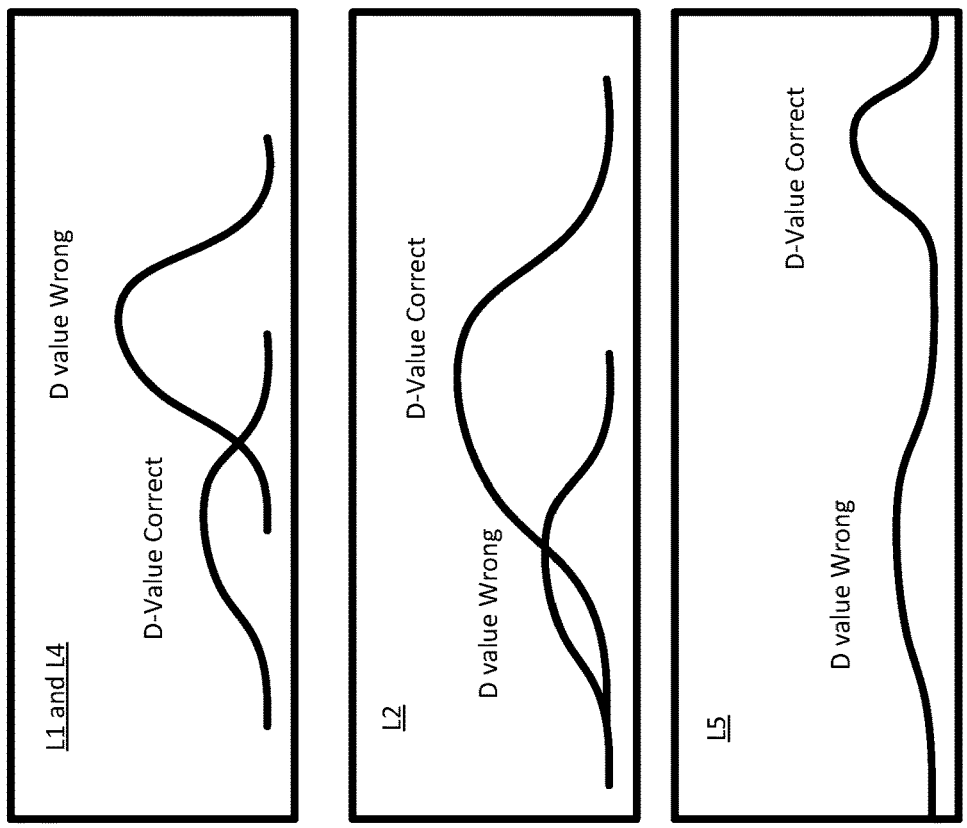

FIG. 7 depicts an example of probability density functions for several segments on a roadway partition. FIG. 7 depicts two parallel roads (L1,L4) and (L2,L3) in which one of them (L2,L3) has an exit ramp (segment L5). A naïve point based map-matchers may have problems in this type of road geometry as probes on the parallel road (going in same direction) get miss map matched, also probes going on exit ramp, sometimes is map matched to the highway. The expected structure of the distance value distributions in KDE also depicted for the segments. The heading value distributions are not depicted. As depicted, the charts show a gaussian distribution for the distance values (D value) for both the correct and erroneous map matches for each of the segments. For example, for the distribution of L1 and L4, the distance values for the correct map matched probes are centered around the centerline of L4/L1 while the distance values for the probe points that were erroneously matched are centered around L2/L3. The distribution is to be expected as certain probes that are further away from the center of L1/L4 get mismatched to L2/L3. Similarly, the correct values for L3 are centered around L2/L3 while the distance values for the erroneous matches are spread out between L5 and L4. A mean μ, and variance σ² may be calculated for each of the distributions.

At act A170, the mapping system 121 generates probability weights for each of the probability density functions. The following equation may be used to generate the probability weights. The equations below may be used when the KDE generates a Gaussian probability function. The KDE function provides the mean μ, and the variance σ². The mean specifies the center of the distribution of the KDE, and the variance describes how "spread out" the PDF is. X is a random variable which is the probability of a probe to be on a link given by the KDE function generated at Act A160.

The probability density function (PDF) is described using the parameters the mean and the variance σ²:

$$X \sim N(\mu, \sigma^2)$$

$$P(X = x \mid \mu, \sigma) = N(x; \mu, \sigma) = \frac{1}{\sqrt{2\sigma^2\mu}} e^{-\frac{(x-\mu)^2}{2\sigma^2}}$$

A PDF is calculated for each of the KDE distributions using the mean and variance for each of the KDE distributions as parameters:

$P_{correct}^{h} = N(\text{h-value}; \mu_{correct}^{h}, \sigma_{correct}^{h})$
$P_{worry}^{h} = N(\text{h-value}; \mu_{wrong}^{h}, \sigma_{wrong}^{h})$
$P_{correct}^{d} = N(\text{d-value}; \mu_{correct}^{d}, \sigma_{correct}^{d})$
$P_{wrong}^{d} = N(\text{d-value}; \mu_{wrong}^{d}, \sigma_{wrong}^{d})$ The probability weights are then calculated for the distance and the heading:

$$\text{h\_weight} = \frac{P_{correct}^{h}}{2} + \frac{(1 - P_{wrong}^{h})}{2}$$

$$\text{d\_weight} = \frac{P_{correct}^{d}}{2} + \frac{(1 - P_{wrong}^{d})}{2}$$

At act A180, the mapping system 121 provides the probability weights for use in real time with the point map matcher. The point map matcher may also use the probability weights (h_weight and d_weight) in the following equation to calculate the probability that a probe report matches to a link.

$$P = \frac{\text{d\_weight} \cdot \int_{A}^{B} \frac{1}{\sigma\sqrt{2\pi}} e^{-\frac{x^2}{2\sigma^2}} dx + \text{h\_weight} \cdot \int_{h-\Delta h}^{h+\Delta h} \frac{1}{\sigma_h\sqrt{2\pi}} e^{-\frac{x^2}{2\sigma_h^2}} dx}{2}$$

where:
A=distanceToSegment, if road is bidirectional and probe is on the left
A=−distanceToSegment, if road is bidirectional and probe is on the right
A=distanceToSegment−nw/2, if road is not bidirectional min The weights may be stored in the geographic database 123 for each segment/link. The workflow of FIG. 5 may be performed offline and not, for example, during real time operation of a map matching application. The historical data and the weights may be updated at regular intervals as additional data is collected or more accurate ground truth data is acquired. The workflow of FIG. 5 may be performed for individual links/segments or may be performed for similar structured segments. For example, probability weights may be calculated for individual segments or for groups of segments that share similar configurations. The stored weights may be used to improve the accuracy of a point based map matcher as described. The stored weights may also be used by other types of map matchers to improve their performance. During operation of a map matching application, the weights may be accessed over the network or may be stored locally, for example in a memory or local geographic database of a navigation device 122.

The mapping system 121 may also generate a confidence value that is calculated as the average of the h_weight and d_weight. The confidence value represents a probability that any probe point was matched correctly to a segment. The confidence value measures the confidence of the accuracy of a point map matcher. The confidence value may be a percentage that is attached to every map-matched result. A user/customer (e.g. navigation system) can choose to trust the map match or not, based on how high or low the confidence value is. The higher the confidence value, the higher the likelihood of its accuracy and consequently trust. If for example, the $P_{correct}^{h}$ is 0.8, the $P_{wrong}^{h}$ is 0.1, the $P_{correct}^{d}$ is 0.6, and the $P_{wrong}^{d}$ is 0.3, then the h weight would be 0.85 and the d_weight would be 0.65. The confidence value would be the average of 0.85 and 0.65 which is 0.75 or 75%. For an unknown probe report, a naïve point based map matcher may be expected to match the segment with the probe report approximately 75% of the time. The confidence value may be provided to a navigation application along with the matched segment. The navigation application may generate a command or routing instruction based on the level of confidence that the navigation application has that the vehicle or device is actually on the matched segment.

Figure 8:
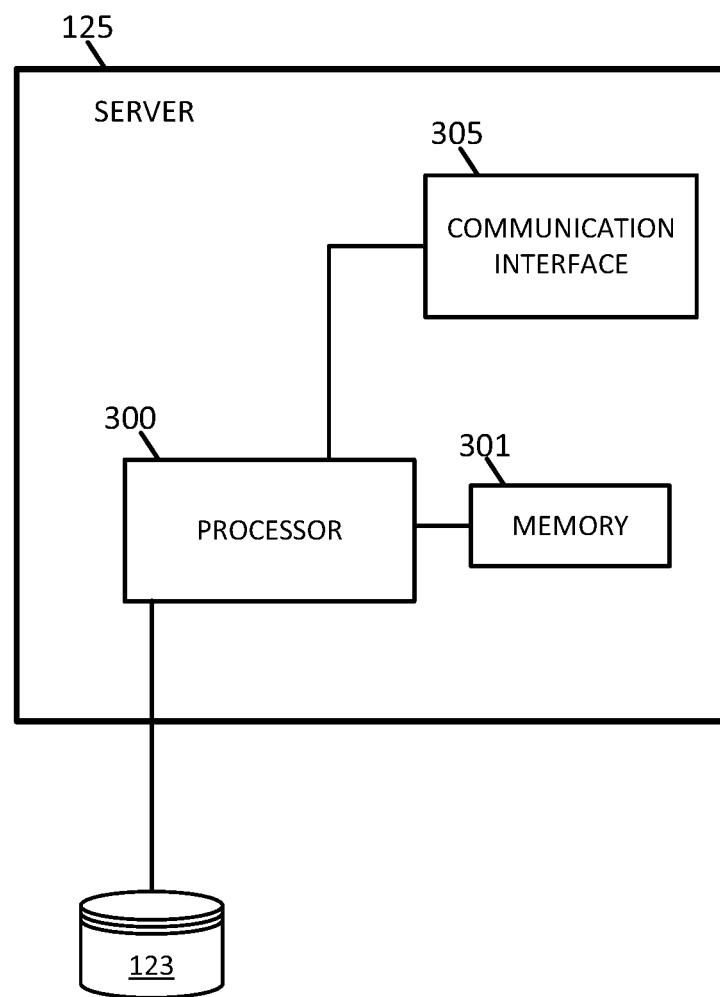
FIG. 8 illustrates an example server of the system of FIG. 2.

FIG. 8 illustrates an example server 125 of the system of FIG. 2. The server 125 includes a processor 300 that is connected to a communications interface 305 and a memory 301. The processor 300 is also connected to the geographic database 123. The communications interface 305 is configured to receive vehicle data from a vehicle. The memory 301 is configured to store road segment data including weights for distance and heading for use in point based map matching. The processor 300 is configured to map match positional data points and headings to a road segment using a point based map matching algorithm and the weights for distance and heading stored in the memory 301.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The communications interface 305 may include any operable connection. An operable connection may be one in which signals, physical communications, and/or logical communications may be sent and/or received. An operable connection may include a physical interface, an electrical interface, and/or a data interface. The communications interface 305 provides for wireless and/or wired communications in any now known or later developed format. The communications interface 305 may include a receiver/transmitter for digital radio signals or broadcast mediums.

The memory 301 may include one or more of a read only memory (ROM), random access memory (RAM), a flash memory, an electronic erasable program read only memory (EEPROM), or other type of memory. The memory 301 is configured to store data for the probe report, road segments, and the map matching algorithms.

Figure 9:
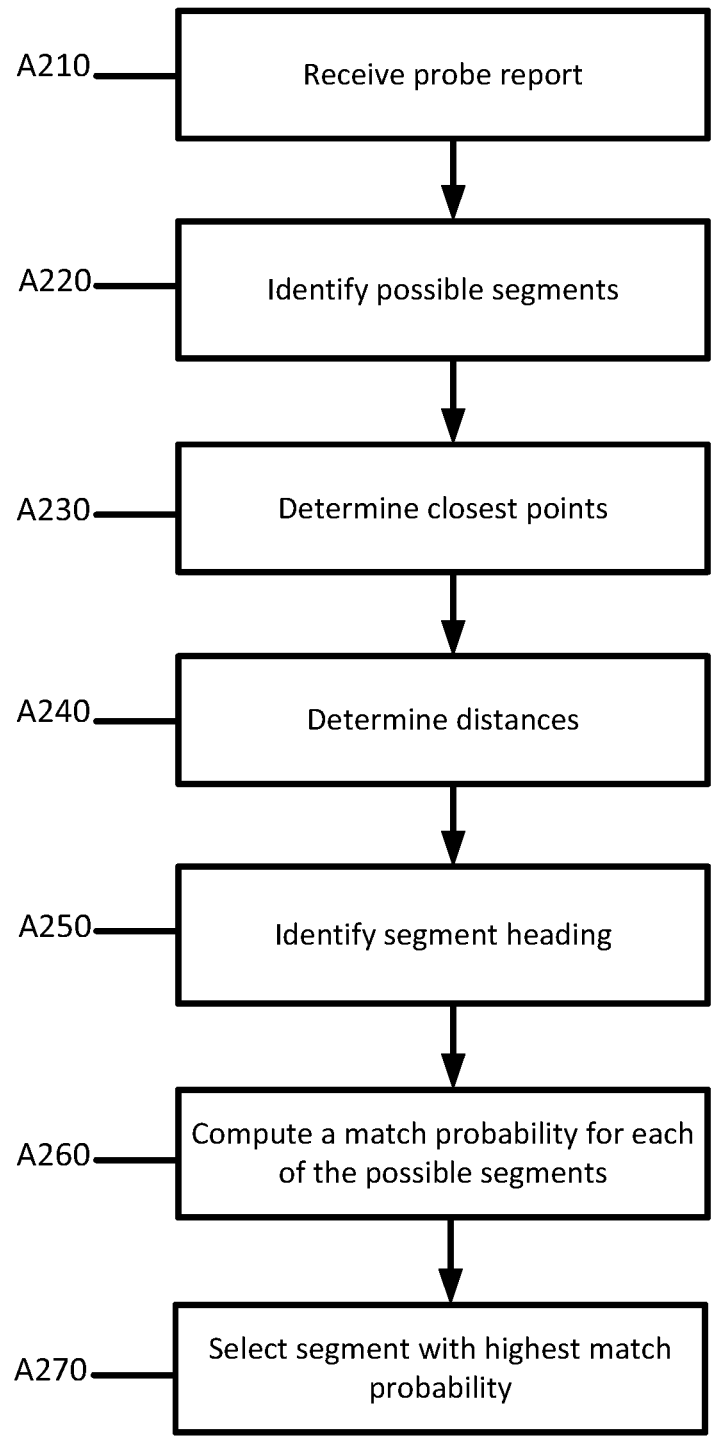
FIG. 9 depicts an example flowchart for map matching a positional point.

FIG. 9 depicts an example workflow for map matching a positional point. As presented in the following sections, the acts may be performed using any combination of the components indicated in FIG. 2, FIG. 8, or FIG. 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210 a probe report is received that includes at least positional coordinates and a heading. The probe report may be generated by, for example, a navigation device 122 or navigation system embedded in a vehicle. The probe report may be processed locally or may be transmitted and received by a server 125 which processes the probe report and returns a matched segment. The positional coordinates and heading may be generated by sensors on or embedded in the vehicle or navigation device. The positional coordinates, may for example, be generated by a GPS or other positioning system. A GPS provides a positional coordinates based on a satellite based radio navigation system. GPS is based on time and the known position of GPS specialized satellites. The satellites carry very stable atomic clocks that are synchronized with one another and with the ground clocks. Any drift from true time maintained on the ground is corrected daily. The satellite locations are known with great precision which allows a latitude and longitude of a receiver to be calculated by comparing signals and timing from the satellites. The heading may be generated using positional circuitry within the vehicle or navigation device. A magnetometer, for example, may be used to determine the heading of the vehicle or device.

At act A220, the processor identifies a plurality of segments based on the positional coordinates. The plurality of segments may be all of the segments within a predefined distance of the positional coordinates. The predefined distance may be set so that the plurality of segments identified are each of the possible segments that the positional coordinates could match with. In an example, if the maximum error for a GPS receiver is 50 meters, then only the segments within 50 meters would be identified as it would be unlikely that the positional point is related to a segment outside that distance. Many GPS receivers may not be able to define a maximum error, so a value may be selected that is within an acceptable error range.

At act A230, the processor determines a closest point between the positional coordinates and each of the plurality of segments. The closest point may be identified using scalar projection of the positional coordinates and a segment. At act A240, the processor calculates a distance to the closest point for each of the plurality of segments. The distance may be calculated as a function of the following equation:

$$distanceToSegment = \sqrt{\left[(lat_p - lat_c)R\frac{\pi}{180}\right]^2 + \left[(lon_p - lon_c)R\frac{\pi}{180}cosineLat\right]^2}$$

where $lat_p$ and $lon_p$ are the latitude and longitude of the probe and $lat_c$ and $lat_c$ are the latitude and longitude of the closest points. cosinelat is calculated as the cosine of (partition upper lat+partition lower lat)/2 where partition upper lat and partition lower lat are defined by a partition that includes all of possible segments and takes into account the curvature.

At act A250, the processor identifies a segment heading for each of the plurality of segments. The segment heading may be stored in the geographic database 123 as an attribute or artifact of the segment. If the segment is an arc or curve, the segment heading may be defined as a function that describes the heading at each point along the arc or curve. The segment heading is a value between 0 and 180 degrees.

At act A260, the processor computes a match probability for each of the segments as a function of the distances, segment headings, heading, distance weight, and heading weight; wherein the distance weight and heading weight are calculated for each segment as a function of a kernel density estimation for a plurality of historical probe data reports and a gaussian probability density function.

$$P = \frac{d\_weight \cdot \int_A^B \frac{1}{\sigma\sqrt{2\pi}} e^{-\frac{x^2}{2\sigma^2}} dx + h\_weight \cdot \int_{h-\Delta h}^{h+\Delta h} \frac{1}{\sigma_h\sqrt{2\pi}} e^{-\frac{x^2}{2\sigma_h^2}} dx}{2}$$

Where:
B=A+nw; n=lane count; w=lane width, m
σ=6.5 m
h=probe heading−segment heading
Δh=1 (it is acceptable heading error)
$\sigma_h$=Angular Deviation−Max(speed)+min Angular Deviation
A=distanceToSegment, if road is bidirectional and probe is on the left
A=−distanceToSegment, if road is bidirectional and probe is on the right
A=distanceToSegment−nw/2, if road is not bidirectional The distance weight and heading weight may be calculated as described above in the workflow of FIG. 5. The calculations of the distribution may be performed offline prior to the acts of A210-A270. To calculate the weights, a distribution of historical data is generated. The distance values of a group of historically successfully map matched probe for a link are recorded. The distance values of the incorrectly map matched probes that were selected by a naïve point based map matcher, but were corrected by a path based map matcher are also recorded. A probability density function is generated for the set of the distance error values and for the heading error values for the accurately point based map matched positional points and the erroneously point based map matched positional points. A probability density function (PDF), or density of a continuous random variable, is a function, whose value at any given point in the set of possible values taken by the random variable can be interpreted as providing a relative likelihood that the value of the random variable would equal that sample. One method of generating the PDF is to use KDE. KDE is a non parametric way to estimate the probability density function of a random variable. KDE is a data smoothing problem where inferences about the entire population are made based on a finite data sample. The entire population here is the expected error when map matching a positional point to the segment. The finite data sample if the historical data. The historical data is thus used to predict the error for a future positional point that is being map matched.

The distribution is also obtained for the heading differences as well for both the successfully matched and incorrectly matched values. The mean and standard derivation values of these distributions are calculated and stored in an artifact for the segment in the geographic database 123.

At act A270, the processor selects a segment with the highest match probability as the map matched segment for the positional point. The map matched segment may be used by the server 125 or device 122 to perform an action relating to navigation of a vehicle. For example, the server 125 or device 122 may provide routing instruction based on the map matched segment, for example to prepare for an upcoming turn or action.

A confidence metric may also be provided with each selection of a segment. The confidence metric represents a probability that the probe point was matched correctly to a segment. The confidence metric measures the confidence of the accuracy of point map matcher. The confidence metric may be a percentage that is attached to every map matched result. A user/customer (e.g. navigation system) can choose to trust the map match or not, based on how high or low the confidence metric is. The higher the confidence metric, the higher the likelihood of its accuracy and consequently trust. The confidence metric may be calculated as an average of the heading and direction weights referenced above. The confidence metric may be stored as an artifact in the geographic database.

In an embodiment, the processor may provide a next step, e.g. routing instruction or vehicular command, based on the confidence metric. If, for example, the confidence metric is low, the processor may require additional input from, for example, a different sensor to identify a current location. In an example if the confidence metric is low, the processor may use a more complex path based map matcher to identify the current location on the roadway.

Figure 10:
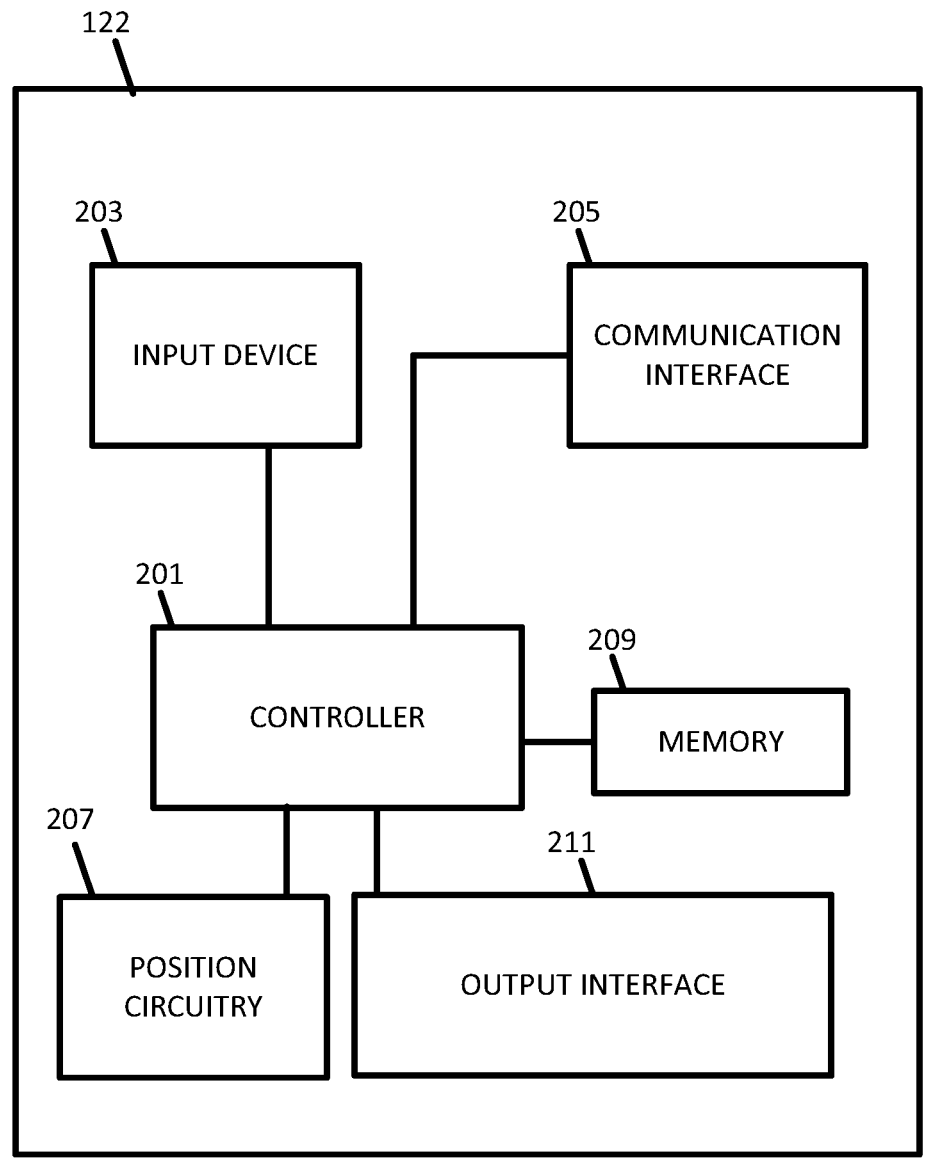
FIG. 10 depicts an example device of the system of FIG. 2.

FIG. 10 illustrates an example device 122 of the system of FIG. 1 that may be configured to map match a positional point using a point based map matcher. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, and an output interface 211. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

The controller 201 may be configured to identify a route from a starting location to a destination. The controller 201 may include a general processor, digital signal processor, an application specific integrated circuit (ASIC), field programmable gate array (FPGA), analog circuit, digital circuit, combinations thereof, or other now known or later developed processor. The controller 201 may be a single device or combinations of devices, such as associated with a network, distributed processing, or cloud computing. The controller 201 may be configured to generate routing commands using data store in the memory 209. The controller 201 may be configured to identify a current location of the device 122 and generate commands to alter the course of the vehicle. The controller 201 may be configured to control the operation of the vehicle or may provide guidance visually or audibly.

For routing, a starting location of a route or a current location may be identified using positional circuitry such as GPS and a map matching application. The positioning circuitry 207, which is an example of a positioning system, is configured to determine an estimated geographic position of the navigation device 122. The movement circuitry, which is an example a movement tracking system, is configured to determine movement of a navigation device 122. The position circuitry 207 and the movement circuitry may be separate systems, or segments of the same positioning or movement circuitry system. In an embodiment, components as described herein with respect to the navigation device 122 may be implemented as a static device. For example, such a device may not include movement circuitry, but may involve a speed or velocity detecting input device.

The controller 201 is configured to map match a positional point and heading to a road segment in the geographic database. Navigation services need to be able to determine the road segment to which a positional point identified by the position circuitry 207 belongs, its position in relation to the map segment geometry and the direction of travel along the segment. This allows applications to establish whether the driver is on the expected route, whether the driver obeys the legal speed limit, the type of road and its characteristics (for example curvature, incline, road surface type, the number of lanes). A point based map matching algorithm may be used to quickly and efficiently identify the road segment given the positional and heading data. The point based map matcher may use weights for a distance and heading generated by a supervised machine learnt network. The supervised machine learnt network is trained using historical data to identify probability distributions for distance and heading errors of GPS acquired positional data for each segment in the roadway network. The machine learnt network may be trained offline and the resulting weights stored as an artifact in the geographic database. During real time operation, the controller 201 may access the artifacts for respective segments to improve the accuracy of a point based map matching algorithm.

The controller 201 may request and receive data using the communications interface. The communications interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format. The communication interface 205 may include a receiver/transmitter for digital radio signals or other broadcast mediums.

The controller 201 may store the route or instructions in a memory 209. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123. The controller 201 may receive updated instructions, traffic data, updated weights, or other data as the vehicle traverses the route.

The controller 201 may also be configured to generate weights used in a map matching algorithm. The controller 201 identifies a set of historical probe reports for a segment/link. The controller 201 map matches positional data in the probe reports using a path based map matcher and a point based map matcher. The path based map matcher is assumed to generate accurate results which are compared against the less accurate point based map matcher to identify mis matched positional points. The controller 201 calculates a distance error value and a heading error value for each of the accurately point based map matched positional points and the erroneously point based map matched positional points. The heading error value may represent an angular difference between the heading of the probe report and the heading of the road segment. Each segment may include a heading. The heading may represent the direction that the centerline or reference line faces at any given point on the centerline or reference line. The heading of the road segment may be stored for each point on the road segment or may be defined by a function (for example, that describes a curve or arc of the road segment). The heading error value, as such, may be a value between 0 and 180, values that represent the possible differences between the heading in the probe report and the heading of the road segment.

In an embodiment, the controller 201 performs the instructions automatically. The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the road segment and node information provided to the navigation device 122. An autonomous vehicle or HAD may be configured to receive instructions from a mapping system 121 or the controller 201 and automatically perform an action.

The device 122 may be integrated in the vehicle, which may include assisted driving vehicles such as autonomous vehicles, highly assisted driving (HAD), and advanced driving assistance systems (ADAS). Any of these assisted driving systems may be incorporated into device 122. Alternatively, an assisted driving device may be included in the vehicle. The assisted driving device may include memory, a processor, and systems to communicate with the device 122. The assisted driving vehicles may response to geographic data received from geographic database 123 and the server 125, which may have been updated.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed. Embodiment 1: A method for providing a point based map matching algorithm, the method comprising: acquiring a plurality of probe reports for a road segment, the plurality of probe reports comprising heading data and a plurality of positional points generated using global positioning systems; map matching the plurality of positional points using a path based map matching algorithm; map matching the plurality of positional points using a point based map matching algorithm; determining accurately point based map matched positional points and erroneously point based map matched positional points using a comparison between the path based map matched positional points and the point based map matched positional points; identifying a distance error value and a heading error value for each of the accurately point based map matched positional points and the erroneously point based map matched positional points; generating, using kernel density estimation, a probability density distribution for each of the distance error values and heading error values for the accurately point based map matched positional points and the erroneously point based map matched positional points; calculating probability weights for each of the probability density distributions; and providing the probability weights for use in real time map matching with the point based map matching algorithm.

Embodiment 2: the method of embodiment 1, further comprising: calculating a confidence metric as a function of the probability weights; and providing the confidence metric for use in real time map matching with the point based map matching algorithm.

Embodiment 3: the method of embodiment 1, wherein the path based map matching algorithm is more accurate than the point based map matching algorithm.

Embodiment 4: the method of embodiment 1, wherein the plurality of probe reports are for road segments include the same configuration.

Embodiment 5: the method of embodiment 1, wherein providing the probability weights comprises: storing the probability weights as an artifact for the road segment in a geographic database.

Embodiment 6: the method of embodiment 1, wherein the heading data is provided by a magnetometer.

Embodiment 7: the method of embodiment 1, wherein the probability density distributions are gaussian.

Embodiment 8: the method of embodiment 7, wherein a respective probability weight is calculated using a mean and a variance of the respective probability density distribution.

Embodiment 9: a method for identify a current road segment of a device, the method comprising: acquiring, by a processor, positional data and heading data of the device; identifying, by the processor, a plurality of road segments based on the positional data; determining, by the processor, a closest point between the positional data and each of the plurality of road segments; calculating, by the processor, a distance to the closest point for each of the plurality of road segments; identifying, by the processor, a road segment heading for each of the plurality of road segments; computing, by the processor, a match probability for each of the plurality of road segments as a function of the distances, road segment headings, heading data, distance weight, and heading weight; wherein the distance weight and heading weight are calculated for each road segment as a function of a kernel density estimation for a plurality of historical probe data reports; and selecting, by the processor, a road segment with the highest match probability as the current road segment for the device.

Embodiment 10: the method of embodiment 9, further comprising: acquiring, by the processor, a confident metric for the road segment calculated as a function of the distance weight and heading weight; and providing, by the processor the confidence metric with the selected road segment to a navigation application.

Embodiment 11: the method of embodiment 10, further comprising: generating a vehicle guidance command based on the selected road segment and the confidence metric.

Embodiment 12: the method of embodiment 9, wherein the positional data is acquired using a global position system.

Embodiment 13: the method of embodiment 9, wherein the distance weight and heading weight are calculated prior to acquiring the positional data and heading data.

Embodiment 14: the method of embodiment 9, wherein the distance weight and heading weight are stored in a geographic database as an artifact for the road segment.

Embodiment 15: a navigation device comprising: a global positioning system configured to provide positional data; a magnetometer configured to provide heading data; a geographic database configured to store road segment heading data, distance weights, and heading weights for a plurality of road segments; wherein the distance weights and heading weights are calculated for each road segment of the plurality of road segments as a function of a kernel density estimation for a plurality of historical probe data reports; and a map matching processor configured to identify a current road segment using a point map matcher, the positional data, the road segment heading data, the distance weights, and the heading weights.

Embodiment 16: the navigation device of embodiment 15, further comprising a routing module configured to alter a route as a function of the identified current road segment.

Embodiment 17: the navigation device of embodiment 15, further comprising: a display configured to output a visual indication of the identified current road segment.

Embodiment 18: the navigation device of embodiment 15, wherein the distance weights and heading weights are calculated based on a probability distribution function generated using kernel density estimation.

Embodiment 19: the navigation device of embodiment 15, wherein the plurality of historical probe data reports are acquired for similarly configured road segments.

Embodiment 20: the navigation device of embodiment 15, wherein the map matching processor is configured to generated probabilities for a plurality of road segments for the positional data; wherein the current road segment is identified as including the highest probability of the plurality of road segments.

The invention claimed is:

1. A method for providing a point based map matching algorithm, the method comprising:
    acquiring a plurality of probe reports for a road segment, the plurality of probe reports comprising heading data and a plurality of positional points generated using global positioning systems;
    map matching the plurality of positional points using a path based map matching algorithm;
    map matching the plurality of positional points using a point based map matching algorithm;
    determining accurately point based map matched positional points and erroneously point based map matched positional points using a comparison between the path based map matched positional points and the point based map matched positional points;
    identifying a distance error value and a heading error value for each of the accurately point based map matched positional points and the erroneously point based map matched positional points;
    generating, using kernel density estimation, a probability density distribution for each of the distance error values and heading error values for the accurately point based map matched positional points and the erroneously point based map matched positional points;
    calculating probability weights for each of the probability density distributions; and
    map matching, by the point based map matching algorithm, positioning data from a GPS (global positioning system) unit of a vehicle to the road segment; and
    updating, by a navigation application, a display of a route of the vehicle based on the map matched road segment and a respective probability weight.

2. The method of claim 1, further comprising:
    calculating a confidence metric as a function of the probability weights; and
    providing the confidence metric for use in real time map matching with the point based map matching algorithm.

3. The method of claim 1, wherein the path based map matching algorithm is more accurate than the point based map matching algorithm.

4. The method of claim 1, wherein the plurality of probe reports are for road segments include the same configuration.

5. The method of claim 1, wherein providing the probability weights comprises:
    storing the probability weights as an artifact for the road segment in a geographic database.

6. The method of claim 1, wherein the heading data is provided by a magnetometer.

7. The method of claim 1, wherein the probability density distributions are gaussian.

8. The method of claim 7, wherein a respective probability weight is calculated using a mean and a variance of the respective probability density distribution.

9. A method for identify a current road segment of a vehicle traversing a roadway, the method comprising:
    acquiring, by a processor, positional data and heading data of the vehicle;
    identifying, by the processor, a plurality of road segments based on the positional data;
    determining, by the processor, a closest point between the positional data and each of the plurality of road segments;
    calculating, by the processor, a distance to the closest point for each of the plurality of road segments;
    identifying, by the processor, a road segment heading for each of the plurality of road segments;
    computing, by the processor, a match probability for each of the plurality of road segments as a function of the distances, road segment headings, heading data, distance weight, and heading weight; wherein the distance weight and heading weight are calculated for each road segment as a function of a kernel density estimation for a plurality of historical probe data reports;
    selecting, by the processor, a road segment with the highest match probability as the current road segment for the vehicle; and
    altering, by the processor, a display of a route as a function of the selected road segment.

10. The method of claim 9, further comprising:
    acquiring, by the processor, a confident metric for the road segment calculated as a function of the distance weight and heading weight; and
    providing, by the processor, the confidence metric with the selected road segment to a navigation application.

11. The method of claim 10, further comprising:
generating a vehicle guidance command based on the selected road segment and the confidence metric.

12. The method of claim 9, wherein the positional data is acquired using a global position system.

13. The method of claim 9, wherein the distance weight and heading weight are calculated prior to acquiring the positional data and heading data.

14. The method of claim 9, wherein the distance weight and heading weight are stored in a geographic database as an artifact for the road segment.

15. A navigation device comprising:
a global positioning system configured to provide positional data;
a magnetometer configured to provide heading data;
a geographic database configured to store road segment heading data, distance weights, and heading weights for a plurality of road segments; wherein the distance weights and heading weights are calculated for each road segment of the plurality of road segments as a function of a kernel density estimation for a plurality of historical probe data reports; and
a map matching processor configured to identify a current road segment using a point map matcher, the positional data, the road segment heading data, the distance weights, and the heading weights.

16. The navigation device of claim 15, further comprising a controller configured to alter a route as a function of the identified current road segment.

17. The navigation device of claim 15, further comprising:
a display configured to output a visual indication of the identified current road segment.

18. The navigation device of claim 15, wherein the distance weights and heading weights are calculated based on a probability distribution function generated using kernel density estimation.

19. The navigation device of claim 15, wherein the plurality of historical probe data reports are acquired for similarly configured road segments.

20. The navigation device of claim 15, wherein the map matching processor is configured to generated probabilities for the plurality of road segments for the positional data; wherein the current road segment is identified as including the highest probability of the plurality of road segments.

* * * * *